United States Patent
Ershag

(10) Patent No.: US 8,419,812 B2
(45) Date of Patent: Apr. 16, 2013

(54) REACTOR FOR PYROLYSIS AND METHOD FOR CHARGING AND EMPTYING SUCH A REACTOR

(75) Inventor: Bengt-Sture Ershag, Hortlax (SE)

(73) Assignee: SES IP AB, Gothenburg (SE)

( * ) Notice: Subject to any disclaimer, the term of this patent is extended or adjusted under 35 U.S.C. 154(b) by 873 days.

(21) Appl. No.: 12/448,019

(22) PCT Filed: Nov. 26, 2007

(86) PCT No.: PCT/SE2007/050899
§ 371 (c)(1),
(2), (4) Date: Sep. 25, 2009

(87) PCT Pub. No.: WO2008/069741
PCT Pub. Date: Jun. 12, 2008

(65) Prior Publication Data
US 2010/0031571 A1    Feb. 11, 2010

(30) Foreign Application Priority Data
Dec. 5, 2006  (SE) ...................................... 0602617

(51) Int. Cl.
*C10J 3/76* (2006.01)
(52) U.S. Cl.
USPC ....... 48/67; 48/61; 48/127.9; 48/76; 422/607; 422/644; 208/107; 165/145
(58) Field of Classification Search ........... 48/61, 127.9, 48/67, 76; 165/145; 208/107; 422/607, 422/644
See application file for complete search history.

(56) References Cited

U.S. PATENT DOCUMENTS

| | | | | |
|---|---|---|---|---|
| 2,315,208 A | * | 3/1943 | Kinnaird | 422/218 |
| 3,433,600 A | * | 3/1969 | Kuo et al. | 422/607 |
| 3,746,515 A | * | 7/1973 | Friedman | 422/626 |
| 4,306,506 A | * | 12/1981 | Rotter | 110/229 |
| 5,435,890 A | * | 7/1995 | Munger | 202/93 |
| 6,235,080 B1 | * | 5/2001 | Shin et al. | 75/445 |
| 6,363,868 B1 | * | 4/2002 | Boswell et al. | 110/213 |
| 2002/0155052 A1 | * | 10/2002 | Paine et al. | 423/277 |
| 2004/0232046 A1 | * | 11/2004 | Tanaka et al. | 208/107 |

FOREIGN PATENT DOCUMENTS

| | | | |
|---|---|---|---|
| DE | 2835267 | * | 2/1980 |
| EP | 0007620 | * | 2/1980 |
| EP | 0076484 | * | 4/1983 |
| WO | WO 0011110 | * | 3/2000 |

OTHER PUBLICATIONS

International Search Report for PCT/SE2007/050899, mailed Mar. 26, 2008.

* cited by examiner

*Primary Examiner* — Kaity V. Handal
(74) *Attorney, Agent, or Firm* — Nixon & Vanderhye P.C.

(57) ABSTRACT

A reactor for the recovery of carbon and hydrocarbons from organic input material through pyrolysis includes a vessel with a chamber that is limited outwardly by an outer jacket and by an upper and a lower end-wall section, and in which chamber input material in fragmented form is to be placed; an inlet which for the introduction of heated inert gas into the chamber for passage through the input material comprises several inlet units arranged in areas in the chamber; and an outlet which for the passage out from the chamber of gas that has passed through the input material that has been placed in the chamber comprises number of outlet units arranged in areas in the chamber.

29 Claims, 5 Drawing Sheets

REACTOR FOR PYROLYSIS AND METHOD FOR CHARGING AND EMPTYING SUCH A REACTOR

This application is the U.S. national phase of International Application No. PCT/SE2007/050899 filed 26 Nov. 2007, which designated the U.S. and claims priority to Sweden Application No. 0602617-3 filed 5 Dec. 2006, the entire contents of each of which are hereby incorporated by reference.

The present invention concerns a reactor for pyrolysis according to the introduction to claim 1, and a method for charging and emptying such a reactor.

BACKGROUND AND SUMMARY

During pyrolysis, or dry distillation, organic input material is heated without the presence of oxygen whereby the material is not combusted but instead is converted to simpler components in the form of fluid and gaseous products that are recovered through a sequence of subsequent process stages that includes condensation. The said pyrolysis technology is normally used for the recovery of the fuel, such as rubber material, that is present in, for example, discarded tyres or in various types of plastic material. During complete pyrolysis, known as "carbonisation", the residue or remainder consists entirely of carbon.

The input material is fragmented during the pyrolysis process to fragments of suitable size, washed, and pre-heated to approximately 100-150° C., after which the material is inserted or loaded into a reactor, known as a "retort", that has the form of a furnace, for conversion to gas, which normally takes place at temperatures of around 450-700° C. A volatile gas, known as "pyrolysis gas", is obtained from the pyrolysis process, which gas contains, in addition to water vapour, carbon monoxide, carbon dioxide, paraffins, olefins, and a number of further hydrocarbons from which oil and gas can be recovered. Carbon black or active carbon can be produced from the solid carbon-containing residue in the reactor after the pyrolysis process. If the residue or coke that remains after the pyrolysis process is to be used as solid fuel, it is separated by sieving from undesired substances such as, for example, steel or glass fibre residue. In the case in which the coke is to be further refined to carbon black or active carbon, further stages of pyrolysis treatment must be carried out, in steps that comprise, among other steps, a raising of the temperature to between 800-900° C. in order to remove any traces of volatile hydrocarbons, a subsequent lowering of the temperature, and possibly steam treatment.

The pyrolysis products that are obtained are very valuable as industrial raw materials, and they normally have qualities that are fully comparable to those of raw materials produced in a conventional manner.

Experiments have shown that the properties and the quality of the said products that have been produced by pyrolysis are determined to a large extent as early as the pyrolysis process, and determined by how well the operating conditions and parameters with respect to, for example, temperatures, rates of heating, retention times, and the concluding cooling times in the reactor can be controlled and monitored during the pyrolysis process.

Reactors are known that allow the return or recirculation of the pyrolysis gas that is formed through the reactor. in order to be able to control and regulate the pyrolysis process more accurately. Such a reactor is known from, for example, SE 513 063 and it is described as a reactor consisting of a chamber that can be opened, which in its closed condition is sealed from the surrounding atmosphere. The chamber is provided with an inlet at one end and an outlet at a second end such that inert or inactive gas at a freely chosen temperature can be circulated through the material that has been placed in the chamber. The gas is caused to pass axially through the chamber of the reactor and to move along its axial direction from the bottom upwards. Charging and emptying of the reactor takes place in batches with the aid of containers that can be exchanged and are provided with holes or perforations, which containers are lifted up and down in the reactor, whereby the gas is caused to pass through the said containers. The outlet is placed in connection with a condenser for the condensation of the pyrolysis gas that has formed to fluid-phase products, and the outlet has a circuit for recirculation of a fraction of the pyrolysis gas to the inlet. At the outlet are arranged not only a temperature detection means for the measurement of the temperature of the outgoing pyrolysis gas and thus for the regulation of the temperature of the gas that is led into the reactor through the inlet such that the temperature that has been determined in advance is maintained in the reactor, but also an arrangement that comprises sensor means, with the aid of which the various components of the pyrolysis gas and their relative amounts can be measured and analysed, whereby the process is maintained and allowed to proceed as long as the material in the reactor continues to emit pyrolysis gas. The said two measurement means are used in a manner based on feedback for the regulation of the operating conditions of the reactor and of its operating parameters.

Although the known reactors described above have proved to function well, they suffer from the disadvantage that the operating conditions inside the reactor itself cannot be controlled in a satisfactory manner. To be more precise, known reactors lack the possibility of being able to control and regulate in an efficient manner and inside the actual reactor chamber the direction of movement of the gas, its speed, its rate of flow and its temperature, during the pyrolysis process. The use of containers provided with holes or perforated that are placed into the reactor for its charging and emptying also influences in a negative manner the possibilities of controlling and monitoring the process parameters inside the reactor chamber.

Thus, a desire has existed for a long time to achieve a reactor with improved possibilities of controlling and monitoring the operating conditions and parameters in the reactor chamber during the pyrolysis process, and a first aim of the present invention is thus to achieve a reactor that makes this possible. A second aim of the invention is to achieve a reactor that allows improved flow of the heat-bearing gas through the reactor, even in cases in which the input material has a fragment size that is relatively low.

Known reactors can usually be opened at the bottom through a hatch arranged in the lower end-wall section of the reactor vessel, for emptying of the carbonaceous residue that remains in the bottom of the reactor chamber after the pyrolysis has been carried out. A defined hatch is not present in certain cases, and the reactor instead can be divided at the connection between the outer jacket and the lower end-wall section, whereby it is possible to access the residue for its removal or emptying of the divided reactor. Alternatively, emptying may take place in the manner described above, namely with the aid of perforated containers or containers provided with holes that are placed into and removed from the reactor chamber in a batchwise manner, through the hatch that is arranged in the upper end-wall section of the reactor vessel.

It should be understood that the requirement that it is to be possible to empty the reactor vessel through its lower end-wall section or at its bottom opposes the possibilities of being able to design the chamber that is a component of the reactor in a free manner, such that the possibilities of control and monitoring of the operating condition are optimised. The possibility of designing the reactor chamber with a fixed bottom that cannot be opened contributes to the ability to optimise the operating conditions without the need to consider the need that it must be possible to empty the reactor in a conventional manner, through, for example, a hatch in the bottom of the chamber. A third aim of the invention, therefore, is to provide a method that facilitates charging and emptying of a reactor of the present type, with a fixed bottom that cannot be opened, and which method has its special area of application for the pyrolysis treatment of input material with a relatively small fragment size.

Further characteristics and advantages of the invention are made clear by the dependent claims.

BRIEF DESCRIPTION OF THE DRAWINGS

The invention will be described in more detail below with reference to the attached drawings, of which

DETAILED DESCRIPTION

Figure 1:
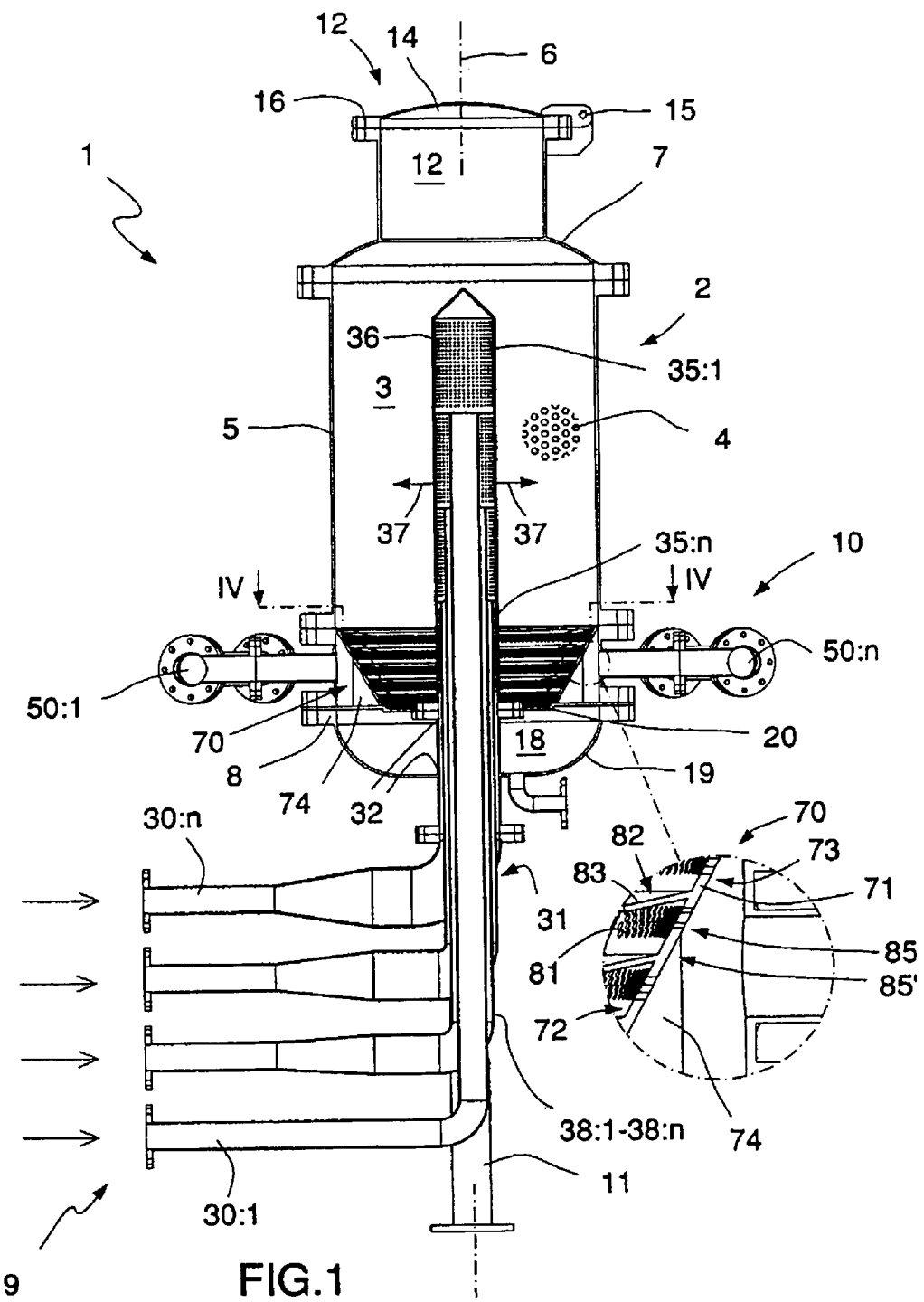
FIG. 1 shows a longitudinal section through a reactor according to the invention.

The reactor generally denoted by reference number 1 in FIG. 1 comprises a vessel 2 manufactured from stainless steel or similar material resistant to high temperatures, with a chamber 3 in which it is intended that input material 4 for pyrolysis treatment is to be received. The chamber 3 is limited by an outer surface 5 formed from a surrounding circularly symmetrical wall that is located concentrically with a central axis 6 that extends vertically through the reactor, an upper end-wall section 7 and a lower end-wall section 8, each of which is essentially perpendicular to the central axis and parallel with each other. In addition, an inlet generally denoted by 9 and an outlet generally denoted by 10 are arranged such than an inert or an inactive gas can be led through the input material 4 that has been placed in the chamber 3. The said input material 4 could be constituted by, for example, any finely divided input material known to one skilled in the arts, where the material is suitable for pyrolysis: fragmented rubber material, for example, from discarded tyres or a plastic material. As is most clearly seen in FIGS. 1 and 3, the reactor 1 demonstrates the form of an extended vertically positioned circular cylinder, whose height is greater than its diameter. The vessel 2 of the reactor 1 is supported by a number of leg-like supports 11.

The upper end-wall section 7 is designed with a circularly symmetrical antechamber 12 whose diameter is slightly smaller, the antechamber being concentrically located with the central axis 6 and in connection with the chamber 3 of the reactor 1. It is not the task of the said antechamber 12 to receive any input material 4. It is solely to allow or facilitate access to the chamber 3 through an opening, generally denoted by the reference number 13, arranged in the upper end-wall section 7 in a manner that allows it to be sealed. The opening 13 comprises a hatch 14 that can be opened automatically, and that is joined at one end to the end-wall section by hinges 15 in a manner that allows it to pivot, and that is provided at its second end with a locking means 16 with which the hatch can be locked in a closed position with the upper end-wall section 7 in a manner that seals gas from the surrounding atmosphere. As is made clear by FIGS. 1 and 3, not only the inlet 9, but also the outlet 10 are arranged in one end-wall of the reactor 1, whereby the said inlet and outlet are arranged in the embodiment that is described here in connection with the lower end-wall section 8 of the reactor.

Figure 2:
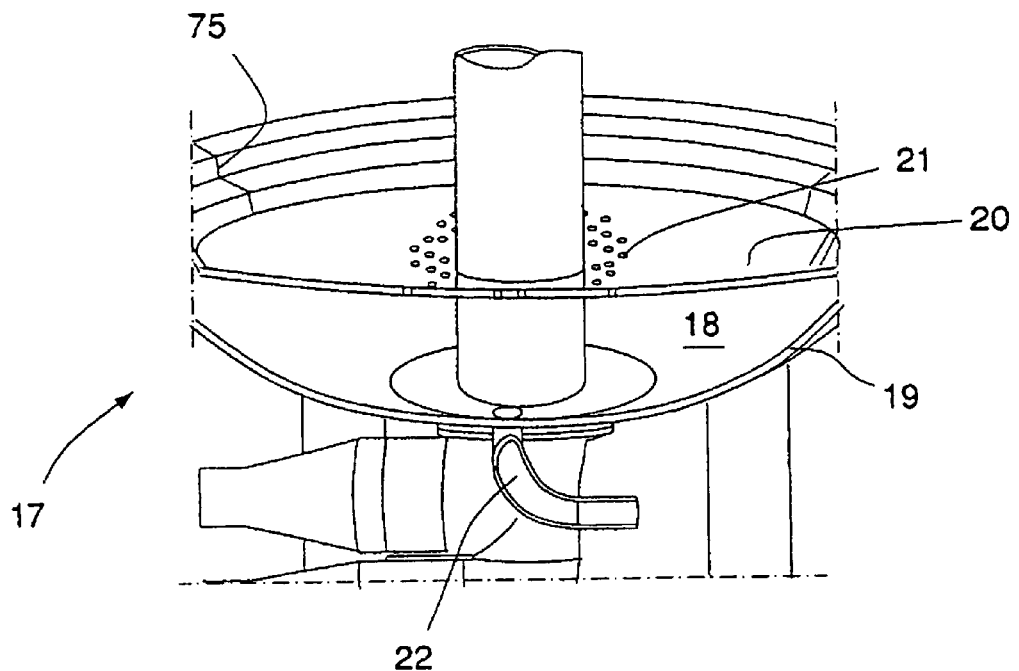
FIG. 2 shows a perspective view in detail of an oil reception compartment located at the bottom of the reactor.

With reference to FIG. 2, the reactor 1 at its lower end-wall section 8 comprises a fluid collector 17, which is located below the input material 4 in the chamber 3, in order to receive and collect the oil-based products of fluid phase that are emitted during the pyrolysis process. The said fluid collector 17 comprises an oil reception compartment 18 located at the bottom of the reactor 1, limited by a lower trough-shaped bottom 19 and a strainer 20 located above this, which strainer forms at the same time the bottom of the reactor vessel 2. The strainer 20 is formed of a circular disc-shaped element provided with perforations 21 and located perpendicular to the central axis 6, which perforations are arranged within a limited area of the central part of the disc-shaped element. The strainer 20 is connected at its periphery to the surrounding edge of the bottom 19 in a manner that allows it to be released, and the complete unit formed in this manner is attached in the inner surface of the lower surrounding edge part of the outer jacket 5. The strainer 20 has been shaped as a bowl with walls that slope downwards such that the oil that is emitted from the input material 4 during the pyrolysis process is led down towards the perforations 21 of the strainer 20 and, on passing these, onwards down into the oil reception compartment 18. An outlet 22 is located at the lowest part of the oil reception compartment 18 with a pipe, in order to lead the oil out from the reactor 1 for further processing and storage in the pyrolysis pl With reference to FIGS. 1 and 3, the inlet 9 for the introduction of inert gas into the reactor chamber 3 comprises a series of separate inlet pipes $30:1$-$30:n$, which are positioned concentrically with each other (one inside of the next) and which pass into a common central circular gas distribution pipe 31 that runs up through the lower end-wall section 8 of the reactor 1 and extends axially into the chamber 3, preferably in such a manner that it coincides coaxially with the central axis 6. As is made dear by FIG. 1, the central gas distribution pipe 31 extends in the manner of a tower into the chamber 3, passing not only through the bottom 19 but also through the strainer 20, in which are arranged through openings 32 for this purpose. The central gas distribution pipe 31 that passes through the bottom 19 and the strainer 20 passes through these in a manner that seals against the passage of gas.

The various inlet pipes $30:1$-$30:n$ that are components of the central gas distribution pipe 31 are terminated at different heights in the vertical direction along the central axis 6 at an inlet unit $35:1$-$35:n$ located at the relevant location in the reactor chamber 3. As is made clear by FIG. 1, the inlet units $35:1$-$35:n$ are stacked on each other, and each of them demonstrates the form of a circularly symmetrical hood. Each such hooded inlet unit $35:1$-$35:n$ is provided with a set of holes or perforations 36 that face outwards radially into the chamber 3 and that are arranged continuous along the surrounding periphery of the relevant inlet unit $35:1$-$35:n$ with a total or sum outlet area that normally essentially corresponds to the cross-sectional area of the relevant inlet pipe 30:1-30:$n$ connected to the inlet unit such that gas can be led without significant resistance in a radial direction out into the reactor chamber 3 through the relevant inlet unit in the manner that is illustrated with the arrow 37 in FIG. 1. As a consequence of the fact that gas is led radially out into the chamber 3 from the inlet units 35:1-35:$n$ and subsequently axially downwards through the ring-shaped compartment that is limited between the outer surface of the central gas distribution pipe 31 and the inner surface of the outer jacket 5, in which compartment the input material 4 has been placed, the pathway of the gas through the input material will be relatively short. Previously experienced problems with a large fall in pressure of gas that is led axially through the chamber, particularly when using finely divided input material, can in this way be avoided.

Closer examination of FIG. 1 should make it clear that the central or innermost inlet pipe 30:1 of the central gas distribution pipe 31 opens out into the uppermost inlet unit 35:1 of the central gas distribution pipe 31, while the inlet pipes 30:$n$ that are inserted one into the other limit between themselves ring-shaped gaps 38:1-38:$n$ that, when regarded from the innermost gas distribution pipe 30:1 and radially outwards, open out into the corresponding inlet unit 35:$n$ among the other inlet units that subsequently follow downwards in the stack of such units. Each one of the said inlet units 35:1-35:$n$ that are stacked on top of each other is bound in a manner that allows its removal to a corresponding first inlet pipe 30:1-30:$n$, through, for example, a threaded connection (not shown in the drawings). The gas flow at the various levels in the vertical direction out into the chamber 3 can in this way be varied through a selection of the total outlet area of the perforations 36 of the inlet unit 35:1-35:$n$ that is mounted onto the corresponding first inlet pipe 30:1-30:$n$.

Figure 5:
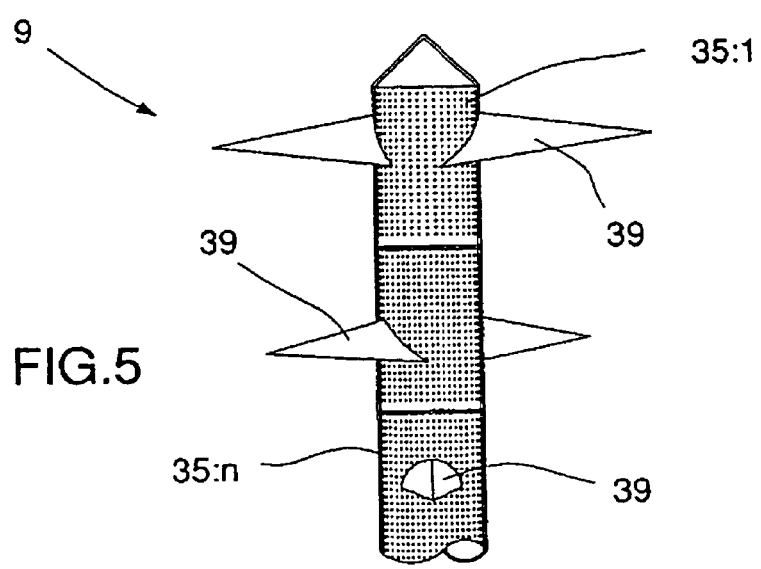
FIG. 5 shows a detailed view of an inlet pipe for the supply of gas to the reactor chamber in an alternative design.

With reference to FIG. 5, the inlet units 35:1-35:$n$ are shown in an alternative design that can further improve the flow of gas out into the reactor chamber 3. The type of inlet unit 35:1-35:$n$ that has been somewhat modified is provided on its outer surface with a number of radially extended wing-like units 39 that support material and that are mounted in a manner that allows their removal, demonstrating when regarded along their longitudinal direction a form that most closely resembles that of a saddle-shaped roof. The said wing-like units 39 extend radially outwards into the chamber 3 and function through the fact that their shape, in the form of a saddled roof, supports the input material 4, prevents it from becoming tightly packed at the bottom of the chamber 3, and promotes the passage of the gas through the input material.

Figure 3:
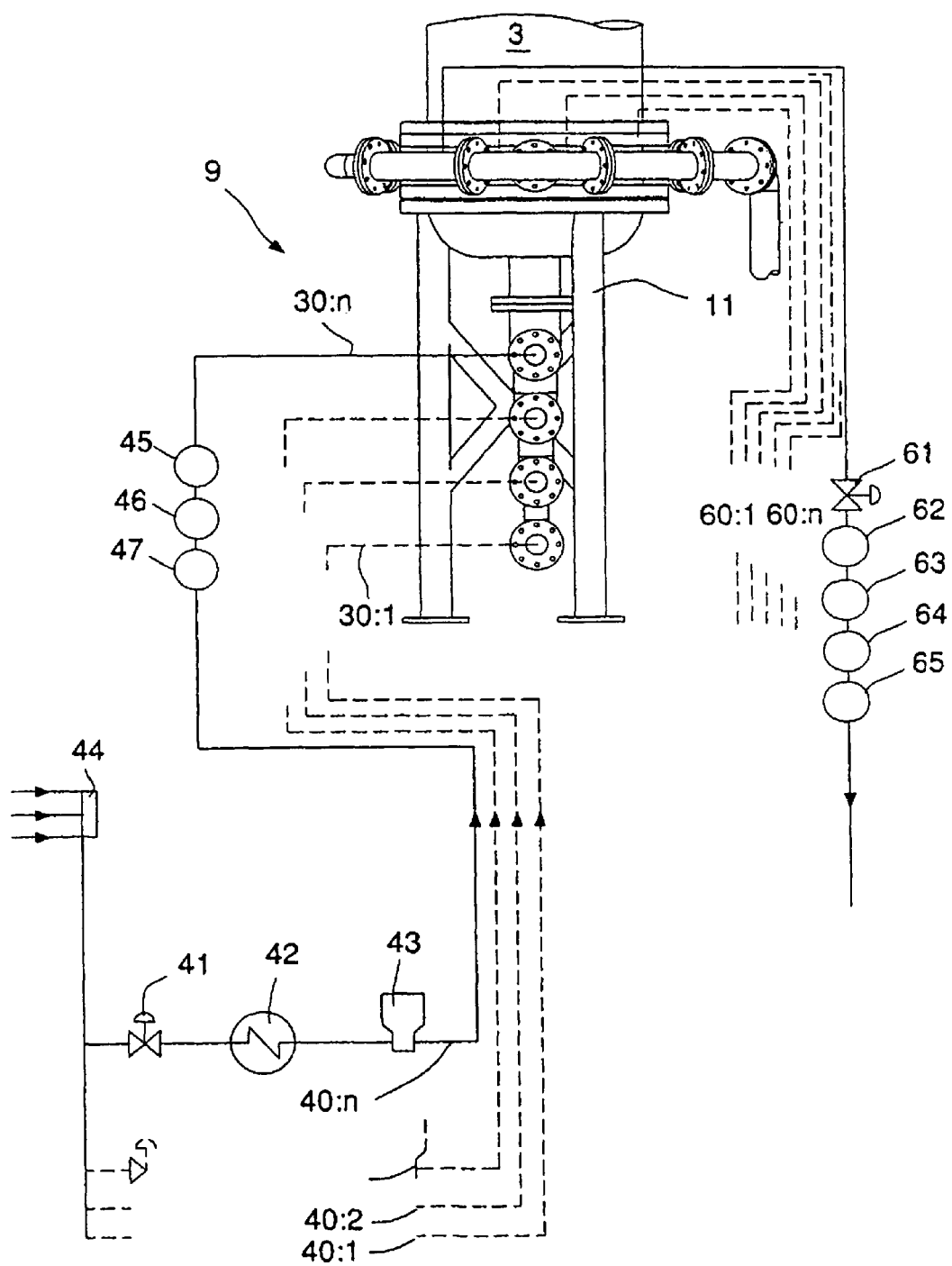
FIG. 3 shows a lower part of the reactor and shows schematically a block diagram for monitoring and controlling the inlet and outlet of the reactor.

With reference to FIG. 3, the inlet 9 comprises a control and regulator circuit 40:1-40:$n$ arranged at the relevant inlet pipe 30:1-30:$n$, which improves further the possibilities to monitor and control the process parameters of the inert gas that is led into the chamber 3. The type of gas, its rate of flow and the temperature of the gas that is led into the chamber 3 at different levels through the relevant inlet pipe 30:1.30:$n$ and relevant inlet unit 35:1-35:$n$ can be controlled and regulated independently of each other with the aid of the regulator circuits 40:1-40:$n$. Each regulator circuit 40:1-40:$n$ comprises for this purpose a valve 41 for the regulation of the gas flow and a heat supply 42 in the form of a heat exchanger for heating the gas. A switching unit 44 is part of the inlet 9, and this makes it possible to switch in other types of gas or medium into the chamber 3. It is possible in this part, for example, that outgoing non-condensed pyrolysis gas from the reactor is switched in such that it is returned to the reactor 1 for recirculation, and it is also possible to mix in cold pyrolysis gas with heated inert gas in order to obtain a gas with a specified temperature for each one of the inlet pipes 30:1-30:$n$, as required. Alternatively, other types of inert gas, for example, nitrogen $N_2$, can be led into the chamber 3 by means of the switch 44, and some other medium can be led into the chamber 3 such as, for example, steam for a rapid cooling of the residue, preferably of carbon, that remains in the chamber after the pyrolysis treatment has been carried out.

Control and monitoring of the process parameters of the gas or medium that is led into the chamber 3 takes place with feedback, such that the results that are obtained by measurement and monitoring of the gas that is led into the chamber 3 through the respective inlet pipes 30:1-30:$n$ are used for control and regulation of the regulator circuits 40:1-40:$n$ that belong to each inlet pipe. In order to achieve the said feedback, the control and regulation circuits 40:1-40:$n$ comprise one measurement and monitoring circuit arranged at each inlet pipe 30:1-30:$n$, with which selected process parameters of the gas that is led into the chamber 3 through each inlet pipe 30:1-30:$n$ can be monitored. Each such measurement and monitoring circuit comprises a temperature sensor 45, a pressure sensor 46, and a flow sensor 47. Through the improved possibilities for controlling the process parameters of the gas that is led out into the chamber 3 through the relative units, it is possible, for example, to allow gas at a higher temperature to pass out through the upper inlet 35:1 and gas at a lower temperature to pass out through the lower inlet 35:$n$, whereby the advantage is achieved that the oil that is emitted from the upper layer of the input material yields a fraction of its heat content to the underlying layer of the input material as it runs downwards in the reactor chamber 3. The yield of oil from the pyrolysis process is in this way increased, for reasons that include the fact that the conversion to gas of oil that has already been released is avoided, while the consumption of energy is at the same time reduced. Furthermore, a higher quality of the carbon that remains as a residue in the reactor is in this way obtained, since the risks of contamination of previously carbonised oil in the lower layers is reduced.

Figure 4:
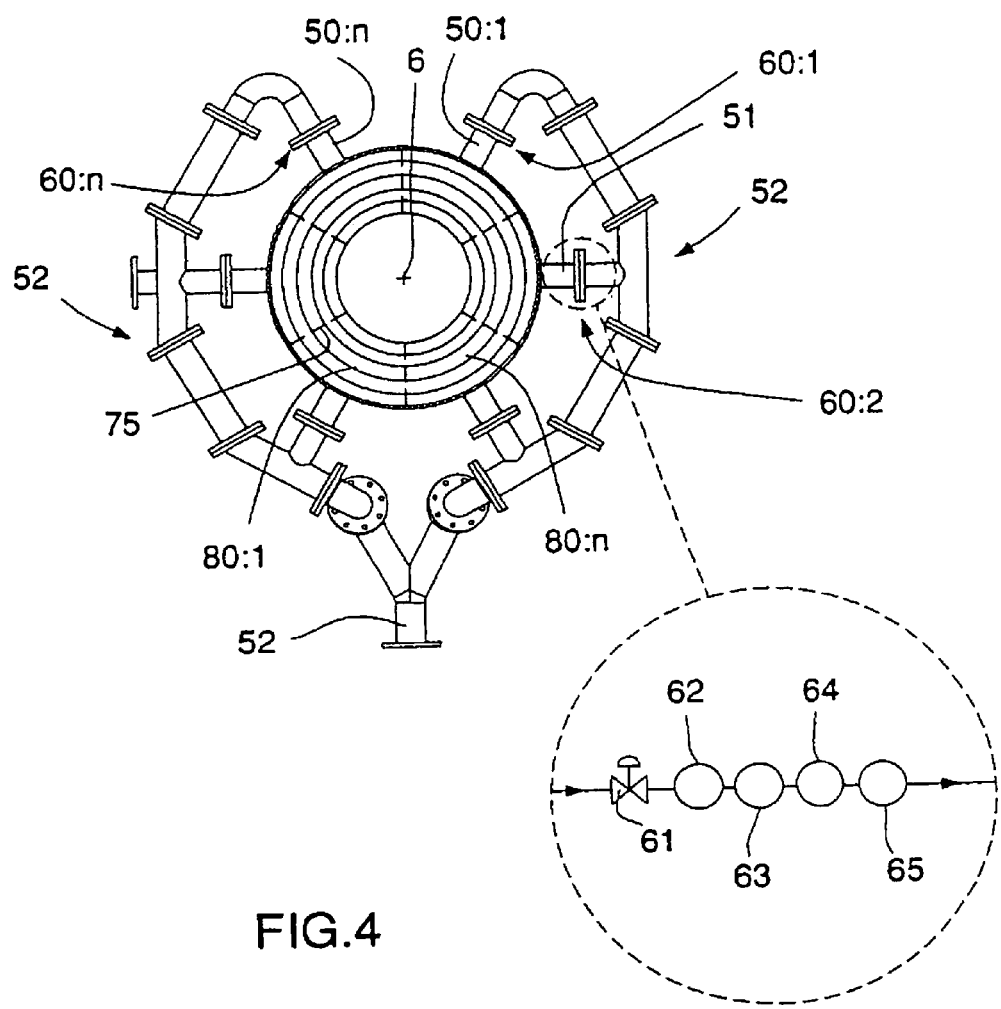
FIG. 4 shows a cross-section through the reactor taken along the line IV-IV in FIG. 1.

With particular reference to FIG. 4, the outlet 10 comprises a series of outlet units 50:1-50:$n$, that are connected for the passage outwards of gas from the reactor chamber 3 to the lower end of the outer surface of the outer jacket 5 through one outlet pipe 51 that belongs to each outlet unit. As is made clear by FIG. 4, the outlet pipes 51 are evenly distributed at equal mutual distances around the circumference or the periphery of the said outer jacket, and they allow gas that has passed axially downwards through the input material 4 to be led out from the outer surface or periphery of the outer jacket 5 according to region or sector.

As is best made clear by FIGS. 3 and 4, the outlet pipes 51 are located in a horizontal plane that extends radially as spokes between the outer surface of the outer jacket 5 of the reactor 1 and a pair of collecting pipes 52 that, running one on each side of the outer jacket, collect gases from the outlet pipes 51 and carry these gases away through a central outlet pipe 52. The process parameters of the gas or the medium that is led out from the chamber 3 through the said relevant outlet pipes 51, are continuously measured through a control and regulation circuit, generally denoted by 60:1-60:$n$, and arranged one at each outlet unit. With reference to the partial enlargement in FIG. 4, each control and regulation circuit 60:1-60:$n$ comprises a valve device 61 for the constriction or closure of the flow through a single outlet pipe 51, a temperature sensor 62, a pressure sensor 63, a flow sensor 64, and a means 65, such as in the form of a gas chromatograph, for the determination of the chemical composition of the gas.

As has been mentioned in the introduction, pyrolysis treatment of input material or goods with a relatively small fraction size places particularly severe demands on the gas flow through the reactor 1.

With reference to FIG. 1, the outlet 10 comprises a means for this purpose, generally denoted by 70, that functions as a barrier through which gas can be transferred between the input material 4 that has been placed in the chamber 3 and the outlet 10. This means is thus a barrier 70 that retains and supports the input material 4 in the chamber 3 while allowing gas to flow freely after its passage through the input material 4 from the chamber 3 to the outlet 10. As is best made clear by the partial enlargement in FIG. 1, the barrier 70 comprises a cone-shaped dividing wall 71 that demonstrates an inner surface 72 facing in towards the central axis 6 of the chamber, which inner surface forms part of the surface of the chamber 3 against which the input material 4 rests, and an outer surface 73 facing away from the central axis 6 that, together with the inner surface of the outer jacket 5 and part of the disc-shaped element that forms part of the strainer 20, limits a ring-shaped surrounding compartment 74 that is concentric relative to the central axis and that is located at the peripheral outer part of the lower end-wall section 8 of the vessel 2.

As is shown in FIG. 4, this peripheral ring-shaped compartment 74 is in turn divided by means of transverse walls 75 into a number of discrete sector compartments 80:1-80:n that are separated from each other. The transverse walls 75 are oriented radially towards the central axis 6 and arranged at equal distances from each other along the circumference of the ring-shaped compartment 74. The cone-shaped dividing wall 71 is united by gas-tight welding at its upper, broader end at its contact points with the inner surface of the outer jacket 5 and united at its lower, narrower end with the upper surface of the disc-shaped element that forms a part of the bottom strainer 20.

As is best made clear by the partial enlargement surrounded by the dash-dot line in FIG. 1, the cone-shaped dividing wall 71 is provided with perforations 81 through which gas can be transported from the reactor chamber 3 to the relevant sector compartment 80:1-80:n and, passing the said relevant sector compartment, onwards out from the reactor through an outlet pipe 51 connected to the said relevant sector compartment. In order to prevent the input material 4 from becoming tightly packed in front of the said perforations 81 and blocking these against the passage of gas, the inner surface 72 of the cone-shaped dividing wall 71 is provided with particle blockers 82. These particle blockers 82 comprise protrusions 83 that are arranged over the inner surface 72 of the dividing wall 71 in regions, which protrusions extend in a fish-scale formation without overlapping each other at an angle downwards and out over the perforations 81. For the embodiments described here the inner surface 72 of the cone-shaped dividing wall 71 demonstrates a number of surrounding sections at a given height that are placed after each other, alternating between sections 85 with perforations and sections 85' without perforations, whereby the protrusions 83, starting from the sections 85' without perforations, extend in a roof-tile fashion downwards across of section 85 with perforations located below.

Figure 6:
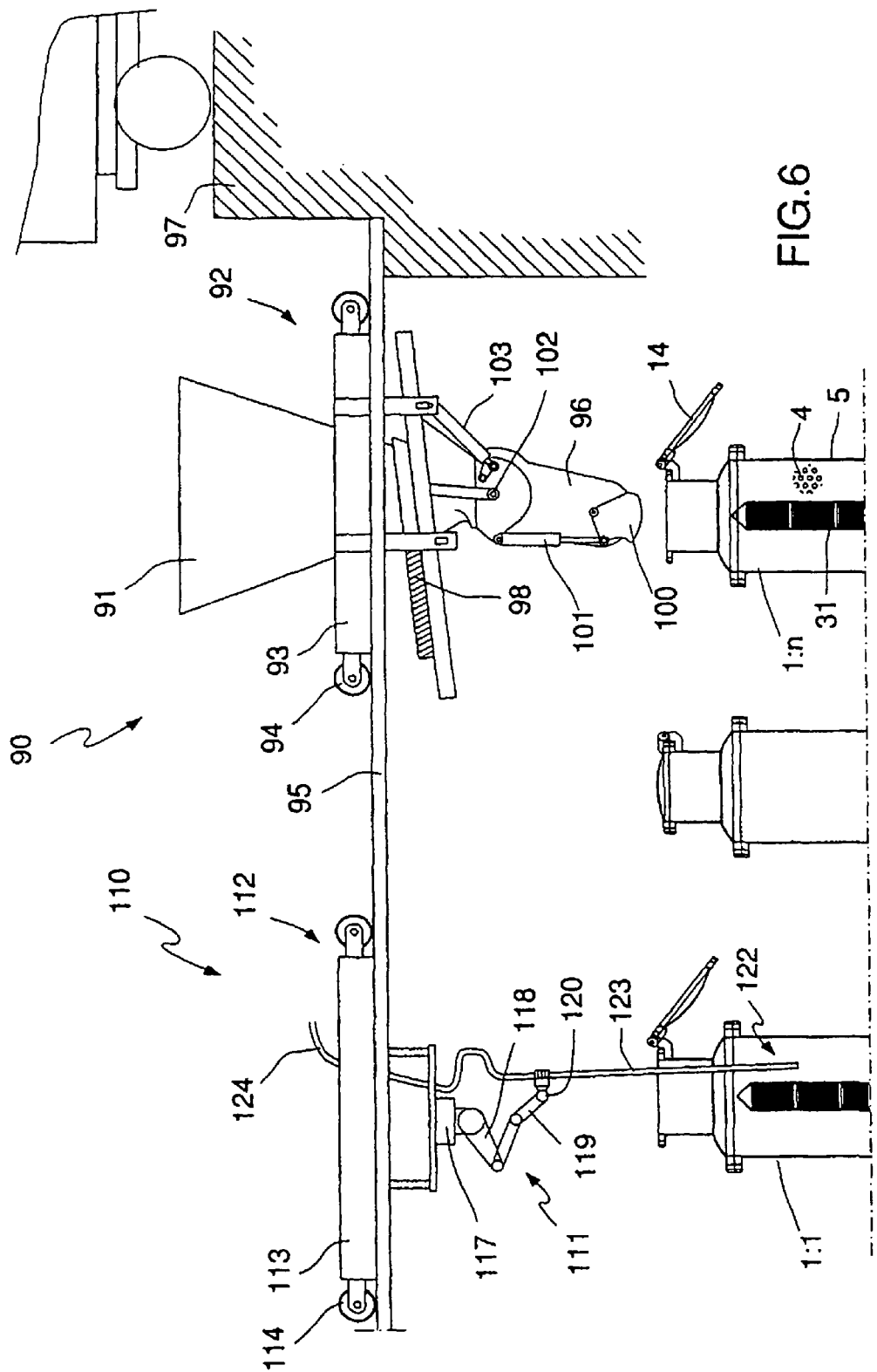
FIG. 6 shows schematically an arrangement that is part of a plant for the charging and emptying of a reactor according to the invention.

With reference to FIG. 6, an arrangement generally denoted with reference number 90 intended for the charging of a reactor of the type that has been described above and an arrangement generally denoted with reference number 110 intended to be used for the emptying of the reactor are shown and described.

The charging device 90 comprises a storage unit or hopper 91 located above the reactor 1 arranged for the storage of input material for pyrolysis, such as the rubber material that is a component of, for example, discarded tyres, or other types of plastic material that has been fragmented to give such a small fraction size that the fuel can run down through a tube. The storage unit 90 is supported on a mobile unit 92 that can be driven in a horizontal plane and that comprises a trolley 93 that in its turn is controlled supported on rails by wheels 94 and runs on rail 95, whereby an electrical drive arrangement, not shown in detail, is used to drive the trolley on the rail. Since the storage unit 90 can be displaced in the horizontal plane, it should be understood that the arrangement can be displaced along a number of identical reactors 1:1-1:n of the present type-located in a line one after the other, and it can be used for the charging of each one of these reactors. The charging device 90 comprises a channel, known as a "goods sluice" 96, equipped with an outlet, which channel unites at its upper part in a funnel formation with the hopper 91, and with which the input material can be fed off in a controlled manner down into the chamber 3 of the reactor 1, through the outlet end of the goods sluice. Filling of the hopper 91 with fragmented input material can take place by any suitable method, for example, by the input material being quite simply tipped into the hopper by means of a suitable transport arrangement. In the embodiment displayed here, the transport arrangement is constituted by a lorry equipped with a tilting loading area, whereby the load is tipped into the hopper from a ramp 97 located at the level of the upper edge of the hopper. Closure of the outlet from the hopper takes place by means of a closure hatch 98. For efficient filling of the chamber of the reactor 1 with input material 4, the outlet end of the goods sluice 96 is provided with a closure hatch 100 whose position is determined by a piston-cylinder unit 101. The degree of filling of the chamber 3 can be determined by, for example, visual inspection, by sensors, or by varying the open period of the hatch 100, whereby the goods, when the hatch 14 is open, runs down into and fills the ring-shaped compartment between the central circular gas distribution pipe 31 and the inner surface of the outer jacket 5, as is shown in the reactor chamber shown in cut-away view. The goods sluice 96 can be pivoted around an axis 102 whose height or position in the vertical direction is determined by the piston-cylinder unit 103. From the emptying position of the goods sluice 96 shown in FIG. 6, the latter can be rotated clockwise to a position close to horizontal (not shown in the drawings), at which position the goods sluice does not constitute an obstacle for displacement along the rail above one or several reactors by means of the mobile unit 92, and it is also not an obstruction when opening or dosing the hatch 14 of the reactor 1.

As is made clear by FIG. 6, the emptying arrangement 110 comprises a robot arm 111, mobile at joints, that is supported suspended under a mobile unit 112, that it is possible, in turn, to displace in a horizontal plane. The said mobile unit 112 comprises a trolley 113 that is controlled supported on rails by wheels 114 and runs on the rail 95, whereby an electrical drive arrangement, not shown in detail, is used to drive the trolley on the rail. The rail 95 is common to both the charging arrangement 90 and the emptying arrangement 110. Since the mobile unit 112 can be displaced in the horizontal plane, it should be understood that the emptying arrangement 110 can be displaced along a number of identical reactors 1:1-1:n of the present type located in a line one after the other, and it can be used for the independent emptying of each one of these reactors.

The robot arm 111 forms a part of an industrial robot comprising a manipulator with a control system (not shown in the drawings). The manipulator comprises a foot 117, a lower arm 118, an upper arm 119 and a wrist joint 120. The control system creates signals for movement that are sent to the driving units of the manipulator, and it communicates with other equipment. The manipulator is so designed, in a customary manner, that it forms the manoeuvrable arm of the industrial robot, which has at least six degrees of freedom. The free outermost arm part of the robot arm 111 supports a suction device 122 that, for the vacuum extraction of the remains or residue of, among other substances, carbon and, for example metallic material that remains in the chamber 3 after the pyrolysis has been carried out, comprises a rigid pipe 123 preferably of stainless steel that at its upper part becomes a flexible or adjustable tube 124 that is in turn placed in connection with a source of negative pressure, not shown in the drawings, and a collection arrangement for the carbonaceous residue. After pyrolysis has been carried out, the residue in the chamber 3 is extracted by suction, by the end of the rigid pipe 123 being displaced down into the chamber by means of the robot arm 111, which is mobile at joints, and the following of a predetermined control program.

According to a further development of the invention, it would be possible for the emptying arrangement 110 to comprise a video camera so arranged in the reactor chamber 3 that the operating personnel would be able to follow the process of emptying on a monitor connected to the camera. It would be appropriate that the video camera be suspended in the chamber 3, or it could be fixed supported on any one of the arm sections of the robot arm 111, mobile at joints.

The present invention is not limited to that which has been described above and is shown in the drawings: it can be changed and modified in a number of different ways within the scope of the innovative concept specified by the attached patent claims.

The invention claimed is:

1. A reactor for the recovery of carbon and hydrocarbons from organic input material through pyrolysis, comprising:
   a vessel with a chamber that is limited outwardly by an outer jacket and by an upper and a lower end-wall section, and in which chamber input material in fragmented form is to be placed;
   an inlet which for the introduction of heated inert gas into the chamber for passage through the input material comprises several inlet units arranged in areas in the chamber;
   an outlet which for the passage out from the chamber of gas that has passed through the input material that has been placed in the chamber comprises number of outlet units (50:1-50:*n*) arranged in areas in the chamber;
   inlet units of the inlet arranged at mutually different levels of height in the chamber above the bottom of the vessel on which the input material is placed, wherein the inlet is placed in gas-transfer connection with a gas-emitting source through an inlet pipe belonging to each individual inlet unit such that the inlet units can lead gas to the chamber independently of each other, and
   wherein the outlet comprises a number of outlet units arranged in areas in the chamber that, for the leading of pyrolysis gas generated in the chamber out from the chamber, are placed in gas-transfer connection with a separate outlet pipe belonging to each outlet unit such that the outlet units can lead gas out from the chamber independently of each other.

2. The reactor according to claim 1, whereby the inlet units are located above the outlet units.

3. The reactor according to claim 1, whereby the inlet units are arranged in a vertical stack on top of each other, one on top of the other, which stack extends axially in the chamber, coinciding coaxially with the central axis of the chamber in which the gas is led radially into the chamber and that the outlet pipes of the outlet units are connected to the outer surface of the outer jacket in which gas is led radially out from the chamber.

4. The reactor according to claim 2, whereby each inlet unit demonstrates the form of a circularly symmetrical hood with holes or perforations arranged around its surrounding periphery in which gas is led radially from the hood in a horizontal plane in all directions and that the outlet pipes of the outlet units are evenly distributed at equal mutual distances around the circumference or periphery of the outer jacket in which gas that has passed through the input material exits in sectors from the chamber in different directions.

5. The reactor according to claim 4, whereby the hood-shaped inlet units are stacked on each other such that they together form the shape of a circular gas distribution pipe that extends axially into the chamber running through the lower end-wall section.

6. The reactor according to claim 5, whereby the circular gas distribution pipe comprises a series of inlet pipes that extend into the chamber and that are located concentrically within each other, one inside the other, such that ring-shaped gaps for the transport of gas are limited between the inlet pipes located one inside the other.

7. The reactor according to claim 6, whereby the central or innermost pipe of the circular gas distribution pipe opens out into the uppermost inlet unit of the stack, while other inlet pipes located inside each other open out into the respective inlet unit among other inlet units that follow each other downwards through the stack of such units.

8. The reactor according to claim 4, comprising inlet units that are provided on their outer surface or on their periphery with radially extended wing-like units.

9. The reactor according to claim 1, comprising a member that acts as a barrier that allows the passage of gas between the input material that has been placed in the chamber and the outlet and which member is provided with particle blockers so designed that particles that are included in the input material are filtered out from the gas while the gas is allowed to pass freely through the barrier.

10. The reactor according to claim 9, whereby the barrier comprises a dividing wall provided with perforations demonstrating an inner surface facing the central axis of the chamber that forms part of the surface located at the bottom of the chamber against which the input material rests, and an outer surface facing away from the central axis onto which the outlet pipes of the outlet units open.

11. The reactor according to claim 9, whereby the particle blocker comprises protrusions that are arranged in a fish-scale formation over the inner surface of the dividing wall and that extend at an angle downwards over the perforations of the dividing wall.

12. The reactor according to claim 9, whereby the dividing wall demonstrates a number of surrounding sections at a given height that are placed after each other, alternating between sections with perforations and sections without perforations, whereby the protrusions, starting from the sections without perforations, extend in a roof-tile fashion obliquely downwards across a section with perforations located below.

13. The reactor according to claim 1, comprising a fluid collector, that is located below the input material that has been placed in the chamber, in order to receive and collect the oil-based products of fluid phase that are emitted from the input material (4) during the pyrolysis process.

14. A plant The reactor according to claim 13, whereby the fluid collector comprises an oil reception compartment located at the lowest part of the reactor vessel limited by a trough-shaped bottom and a strainer located above the said bottom formed by a circular disc-shaped element perpendicular to the central axis, which strainer forms at the same time the bottom of the reactor chamber, and is provided with perforations that allow oils that are emitted from the input material to run down into the oil reception compartment.

15. The reactor according to claim 14, whereby the strainer has been given the form of a bowl with downwardly sloping walls such that the oil that is emitted from the input material during the pyrolysis process is led downwards towards the perforations of the strainer.

16. The reactor according to claim 1, whereby the outlet pipes that belong to the outlet units extend radially as spokes between the outer surface of the outer jacket and a pair of collector pipes that pass one on each side of the outer jacket, collect gases from the outlet pipes and carry these away through a central outlet pipe.

17. The reactor according to claim 1, comprising a first control and monitoring circuit with which process parameters of the gas that is led into the chamber through the respective inlet unit can be controlled and monitored.

18. The reactor according to claim 16, whereby a first control and monitoring circuit is arranged for each one of the said inlet units.

19. The reactor according to claim 18, whereby each first control and monitoring circuit comprises a valve device for regulation of the gas flow and a heater to heat the gas.

20. The reactor according to claim 18, whereby each first control and monitoring circuit comprises a switch for switching among different types of medium to the chamber.

21. The reactor according to claim 17, whereby the first control and monitoring circuit comprises a measurement circuit consisting of a temperature sensor, a pressure sensor, and a flow sensor.

22. The reactor according to claim 1, comprising a second control and monitoring circuit with which process parameters of the gas that is led out from the chamber through the respective outlet units can be controlled and monitored.

23. The reactor according to claim 22, whereby the second control and monitoring circuit is arranged for each one of the said outlet units.

24. The reactor according to claim 22, comprising a valve device for the regulation of the gas flow out from the chamber.

25. The reactor according to claim 22, comprising a measurement circuit consisting of a temperature sensor, a pressure sensor, a flow sensor and a means for analysing the chemical composition of the gas.

26. The reactor according to claim 1, comprising a hatch which when in a closed position closes an opening of the vessel, a charging device with which fragmented input material is fed into the chamber by being emptied down into the chamber and a discharge device to which the pre-treated material is removed from the chamber by being sucked out of the chamber by means of a discharge device comprising a tubular member, wherein both the charge and discharge devices are are located above the reactor.

27. The reactor according to claim 26, comprising a hopper located above the reactor for the storage of input material, and a channel, known as a goods sluice, provided with an outlet, that unites at its upper part in a funnel with the hopper and with which the input material can be fed down into the chamber of the reactor in a controlled manner through the outlet end of the goods sluice whereby a robot with a mobile arm is used to manipulate the tube when withdrawing by suction material that has been completely processed up from the reactor chamber.

28. The reactor according to claim 27, whereby the hopper is supported on a mobile unit that can be displaced in a horizontal plane above the reactor and that the robot is supported in a similar manner by a mobile unit that can be displaced in a horizontal plane above the reactor.

29. The reactor according to claim 28, whereby several reactors are arranged in a line one after the other, such that each reactor receives input material from the hopper.

* * * * *